Oct. 14, 1930.      G. CARLSON      1,778,624
BOX AND TUBE CONNECTER
Filed Aug. 13, 1929

Inventor:
George Carlson.
by Charles V. Mullan
His Attorney.

Patented Oct. 14, 1930

1,778,624

UNITED STATES PATENT OFFICE

GEORGE CARLSON, OF ANSONIA, CONNECTICUT, ASSIGNOR TO GENERAL ELECTRIC COMPANY, A CORPORATION OF NEW YORK

BOX AND TUBE CONNECTER

Application filed August 13, 1929. Serial No. 385,601.

The present invention relates to electrical conduit house wiring and more especially to the means for connecting the ends of conduits to outlet or junction boxes and known as box and tube connecters.

The object of my invention is the provision of an improved box and tube connecter which shall positively clamp a tube to a box, whether entering through the sides or bottom thereof, by the mere turning up of a single screw readily accessible through the open side of the box, and which shall provide a finish bushing about the electrical wires and direct the free ends thereof toward the open side of the box irrespective of whether the tube enclosing the wires enters through a side or bottom of the box.

Figure 1:
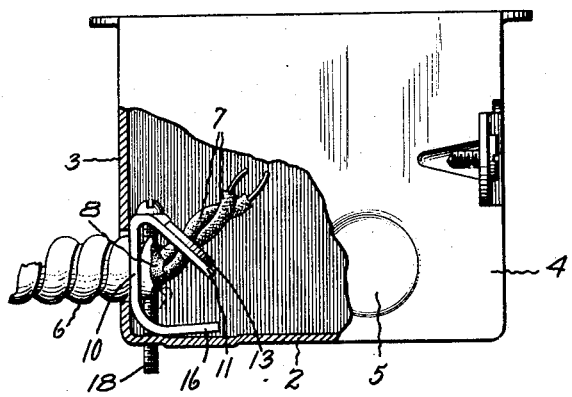
Figure 2:
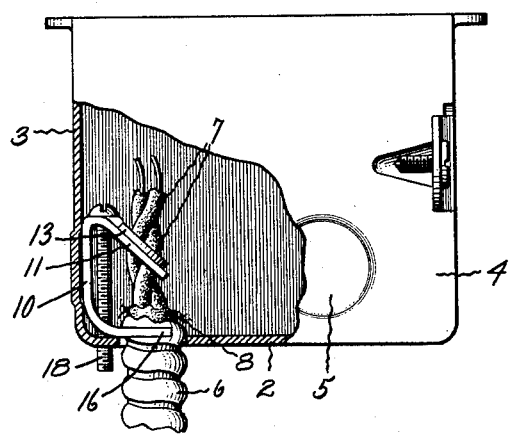

One embodiment of the invention is shown in the accompanying drawing in which Fig. 1 is a side elevation, with parts broken away, of an outlet box and section of conduit entering through an end wall thereof and held by my improved connecter; Fig. 2 is a similar view showing the conduit tube entering through the bottom of the outlet box, and Fig. 3 is a perspective view of my connecter and its clamping screw detached from the box.

The box, which may be of any of the various types now in use, has in its bottom, end and side walls 2, 3 and 4, a plurality of knockouts 5 or tube openings closed by disc plugs adapted to be displaced or knocked out whereby it is practicable for an installation workman to prepare a box for the entry thereinto of a conduit running from any direction by a hammer blow upon the proper knockout.

The conduit 6 shown is of the flexible armored conductor type, but it is to be understood that the particular type of conduit is immaterial. The conductors 7 are usually flexible wires individually insulated and together enclosed in a braided or otherwise constructed insulating tube 8.

Figure 3:
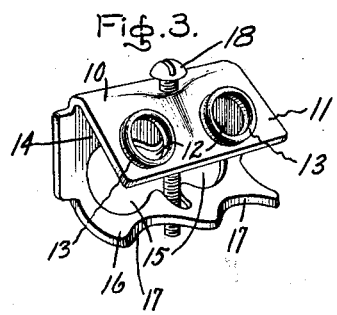

As shown, more particularly in Fig. 3, my connecter consists of a short section 10 of springy sheet metal bent to form vertical and horizontal portions which are connected by a curved resilient portion. The vertical portion has a downwardly sloping portion 11 forming an acute angle therewith and having two apertures 12 of a size to permit free passage of the flexible wires 7 and having the peripheries thereof struck up to form flanges or bushings 13. In the vertical or back portion 14 is an aperture 15 somewhat of the shape of a figure 8, while the lower free edge portion 16 is provided with two crescent-shaped recesses 17. The connecter is provided with aligned transverse passages for a set screw 18 designed to extend therethrough and enter a tapped screw hole in the bottom of the box disposed symmetrically of a pair of knockouts therein.

With the conduit 6 entering a knockout in the end wall of the box, as shown in Fig. 1, it will be received in the aperture 15 of the connecter and its wires 7 in one of the bushed apertures 12. Upon turning down upon the screw 18, the connecter is forced downward so that the upper edge of the aperture 15 engages the conduit 6 and forces it against the lower edge of the knockout opening and securely clamps it in place.

The connecter is enabled to bend at the curved portion which connects the vertical and horizontal portions, because the conduit openings greatly reduce the section of metal in this region. The connecter is held in place by a single vertical screw 18, which is placed close to the wall 3 of the box and in such position that it exerts a straight downward pressure on the connecter, thereby causing the vertical portion thereof to slide on the wall of the box, and in so doing to clamp a conduit in place and also cover that portion of the knock-out opening which is not filled by the conduit, it being noted that the conduit is of somewhat smaller diameter than the opening. This arrangement effectively prevents any flame which may be caused by a short circuit within the metal box from passing through the space around the conduit and setting fire to inflammable material surrounding it.

With the conduit entering a knock-out in the bottom wall of the box, as shown in Fig. 2, it will be clamped in a similar manner by the advance of the lower edge 17 of the connecter thereagainst, and the metal adjacent said edge will cover the space in each knockout opening not filled by the conduit. Since the vertical part of the connecter presents a relatively large surface area which is always in sliding contact with the vertical wall 3 of the box, it follows that the chance of the connecter being twisted out of line or failing to properly clamp the conduits and cover the openings is reduced to negligible amount, and this notwithstanding any carelessness on the part of the wireman. The fact that the connecter has a portion that springs or yields when subjected to pressure has the added advantage of preventing the parts from working loose due to any cause. Another advantage of the construction resides in the fact that the connecter always occupies the same position, whether the conduit enters the box from the side or the bottom. This avoids the necessity of having to reset the connecter to suit different wiring conditions. The conduits may enter the box at the side or the bottom, either singly or in pairs, or one conduit may enter from the side and one from the bottom.

Being made of sheet metal, the connecter can be stamped from sheet stock by one operation and subsequently bent to the shape shown.

It is evident that my connecter, besides being highly efficient, is simply and of low construction cost, occupies a minimum amount of space within the box and is adapted without being shifted about to function with conduits entering through either wall of the box and further that it overlies and closes the crescent opening left between a knockout and a smaller size conduit installed therein.

While I have described and shown the best embodiment of the invention known to me, I do not desire to be restricted thereto.

What I claim as new and desire to secure by Letters Patent of the United States, is:

1. A box and tube connecter comprising a section of springy sheet metal bent longitudinally into a diagonal plane portion and an integral underlying semicylindrical portion, said plane portion having a bushed aperture, said semicylindrical portion having a tube gripping aperture and the free edge of the latter portion having tube gripping recesses, and screw clamping means passing transversely therethrough and adapted to engage an aperture of the box.

2. The combination with an outlet box provided with knockouts and screw holes in the bottom wall thereof, of a box and tube connecter comprising overlying plane and semicylindrical portions connected at one edge and free at the other, said portions having apertures for receiving conductors and tubes, and screw means extending transversely of said connecter into the said screw holes of the box and operating to move said connecter in sliding contact with side and bottom walls of said box.

3. The combination with an outlet box provided with knockouts in its side and bottom walls and with screw holes in said bottom wall symmetrically disposed to said knockouts, of a tube and box connecter of sheet metal having a bushed aperture in the plane surface thereof, a tube gripping aperture in one wall thereof and tube gripping recesses in the free edge of said wall, and screw means passing transversely through said connecter into a screw hole of the box and operating to move said connecter in sliding contact with side and bottom walls of said box.

4. The combination with an outlet box provided with knockouts, a box and tube connecter having a plane portion provided with a bushed aperture and normally disposed diagonally to an internal corner of said box and a curved portion underlying said plane portion and provided with means to engage tubes entering the box through the side or bottom walls thereof, and means for attaching said connecter to said box.

5. An outlet box provided with knockouts, in combination with a connecter having a portion which slides on the vertical wall of the box and has an edge arranged to engage a conduit, a second portion forming an acute angle with the first which has an opening to receive the wires from the conduit, and a screw which holds the connecter against the vertical wall of the box and also causes it to clamp a conduit.

In witness whereof I have hereunto set my hand this 10th day of August, 1929.

GEORGE CARLSON.